United States Patent [19]

Hoogenboom

[11] 4,319,606
[45] Mar. 16, 1982

[54] FLUID PRESSURE REGULATOR VALVE

[75] Inventor: Leo Hoogenboom, 13 Hillcrest Dr., Ballston Lake, N.Y. 12019

[73] Assignee: Mechanical Technology Incorporated, Latham, N.Y.

[21] Appl. No.: 160,317

[22] Filed: Jun. 17, 1980

[51] Int. Cl.³ .................. F16K 31/06; G05D 16/20
[52] U.S. Cl. ................. 137/625.3; 251/129; 251/DIG. 3
[58] Field of Search .............. 251/DIG. 3, 129; 137/625.3

[56] References Cited

U.S. PATENT DOCUMENTS

| | | | |
|---|---|---|---|
| 2,638,925 | 5/1953 | Monahan | 251/DIG. 3 |
| 3,688,495 | 9/1972 | Fehler et al. | 251/141 X |
| 3,874,407 | 4/1975 | Griswold | 251/129 X |
| 3,976,280 | 8/1976 | Alexander et al. | 251/DIG. 3 |
| 4,204,553 | 5/1980 | Hayward et al. | 251/DIG. 3 |

FOREIGN PATENT DOCUMENTS 2316453 10/1973 Fed. Rep. of Germany ... 251/DIG. 3

*Primary Examiner*—Arnold Rosenthal
*Attorney, Agent, or Firm*—Joseph V. Claeys

[57] ABSTRACT

A fluid pressure regulator valve comprising a base member designed to be secured in a fluid conduit in a position to stop all fluid flow through the conduit with the regulator valve in a fully closed position. The base member has an orifice formed through it which is sized to determine the maximum fluid flow rate through the regulator valve with the valve in a fully open position. An elongated helically coiled spring member is secured to the base member and is designed so that its coils are compressed into engagement with each other so as to enclose the sides of the spring member in a fluid tight manner. The helically coiled spring member has a central open passageway with one end closed in a fluid-tight manner and the other open end secured over the orifice through the base member. A magnetically permeable armature is secured to the closed end of the helically coiled spring. An electromagnet is positioned adjacent the armature for producing lines of magnetic flux which thread the armature and cause it to flex the helically coiled spring so as to open spaces between the compressed coils comprising the enclosed sides of the spring and allow fluid flow through the regulator valve upon excitation current being supplied to the electromagnet. Pressure regulation is obtained by sensing the voltage required to open the valve. Comparison of the valve opening voltage to a reference voltage results in a change of the on-time versus off-time of the valve, if the two voltages are not within a specified interval of each other. The valve is intended for a wide flow control range and for digital operation.

11 Claims, 3 Drawing Figures

U.S. Patent   Mar. 16, 1982   4,319,606
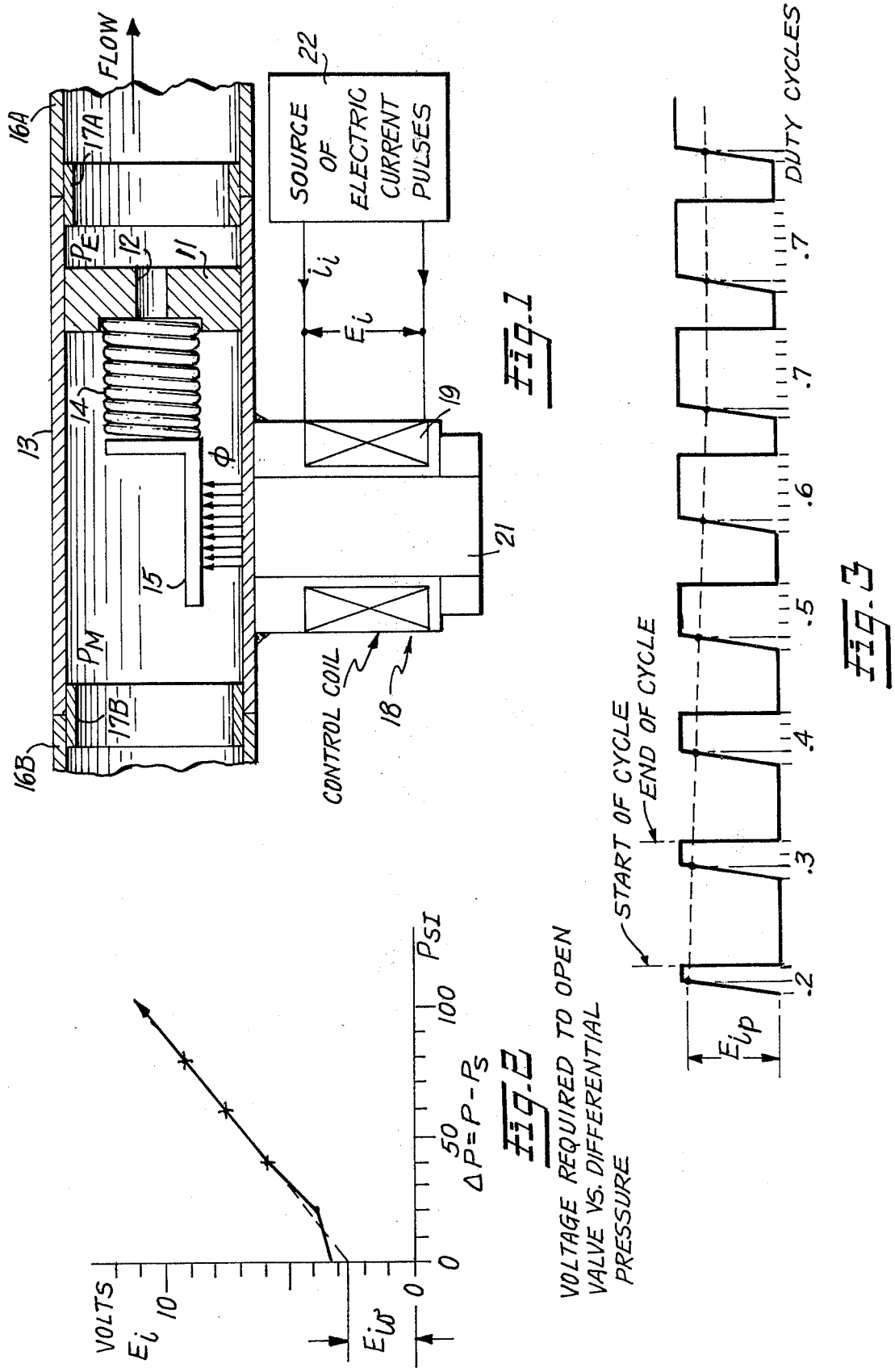

FLUID PRESSURE REGULATOR VALVE

TECHNICAL FIELD

This invention relates to a new and improved fluid pressure regulator valve.

More specifically, the invention relates to a gas pressure regulator valve for finely controlling the pressure of gas in an enclosed volume which normally builds up in pressure by bleeding off gas at a controlled variable rate whereby the pressure of the gas in the enclosed volume can be maintained at a desired value within a wide range of pressure values.

BACKGROUND ART AND PROBLEM

Compressors of the free-piston resonant type driven by an electrodynamic linear oscillating motor are described in U.S. Pat. No. 3,937,600—issued Feb. 10, 1976 for a "Controlled Stroke Electrodynamic Linear Compressor" and in U.S. Pat. No. 4,067,667—issued Jan. 10, 1978 for a "Controlled Stroke Electrodynamic Oscillating Motor Compressor"—by Harlan V. White and are assigned to Mechanical Technology, Incorporated. In free-resonant piston compressors of the type disclosed in these prior art patents, the springmass system of the compressor is forced into vibration by the linear reciprocating motor and is arranged to have a selectively variable resonant frequency generally centered on the power line frequency. For this purpose the resonant piston compressor (RPC) is provided with porting means which are operative to variably control the pressure of gas in enclosed volumes which comprise resilient gas springs operative at opposite ends of each cycle of the oscillating (reciprocating) resonant piston plunger assembly. By varying the pressure of gas in the enclosed volumes comprising the resilient gas springs, the stiffness of the gas springs can be changed to thereby vary the natural frequency of the spring-mass system of the compressor. In copending U.S. application Ser. No. 160,429, filed concurrently with this application, entitled "Resonant Piston Compressor Having Improved Stroke Control for Load-Following Electric Heat Pumps and the Like", by Peter W. Curwen and Richard A. Dorman, inventors, and assigned to Mechanical Technology, Incorporated, an improved method and piston and stroke control system for an RPC is described. In this improved RPC and stroke control system, the enclosed volumes comprising the resilient gas spring means of the RPC communicate through a suitable porting system with a common manifold whose gas pressure directly controls the pressure of the gas in the enclosed volumes comprising the resilient gas spring means. The RPC of this system requires for its operation that the stiffness of the two enclosed volumes comprising the gas springs at opposite ends of the stroke of the resonant-free piston plunger assembly be controlled in order to set the resonant frequency at which the RPC operates. The stiffness of the gas springs is determined by the pressure of the gas in the enclosed volumes comprising the gas springs which in turn is controlled by the pressure of the gas in the common manifold. The present invention was devised to make available a reliable and relatively low cost gas pressure regulator valve for finely regulating (modulating) the pressure of the gas in the common manifold so as to in effect regulate the pressure of the gas in the enclosed volumes comprising the resilient gas spring means of the RPC.

DISCLOSURE OF INVENTION

A primary object of the invention is to provide a new and improved fluid pressure regulator valve.

A more specific object of the invention is to provide an improved gas pressure regulator valve for regulating (modulating) the pressure of gas in an enclosed volumn (which normally builds up in pressure) by bleeding off gas at a controlled variable rate whereby the pressure of the gas in the enclosed volume can be maintained at a desired value within a wide range of pressure values and flow rates.

A still further object of the invention is to provide an improved fluid pressure regulator valve having the above characteristics which is relatively low cost, simple to construct and reliable in operation.

A feature of the invention is the provision of a regulator valve comprising a base member adapted to be secured in a fluid conduit in a position to stop all fluid flow through the conduit with the regulator valve in a fully closed position. The base member has an orifice formed therethrough and sized to determine the maximum flow rate through the regulator valve with the valve in a fully open position. An elongated helically coiled spring member is provided having the coils thereof compressed into engagement with each other to enclose a central open passageway through the helical spring in a fluid-tight manner. One end of the central open passageway also is closed in a fluid-tight manner and the remaining open end is secured over the orifice through the base member. A magnetically permeable armature is secured to the closed end of the helically coiled spring and an electromagnet is positioned adjacent the armature for producing lines of magnetic flux which thread the armature and cause the armature to flex the helically coiled spring member so as to open spaces between the compressed coils comprising the enclosed sides of the spring member and allow fluid flow through the regulator valve upon excitation current being supplied to the electromagnet.

The helically coiled spring member, the base member and the armature all are fabricated from stainless steel and dimensioned such that with the helical coils of the spring member flexed to the fully open position, the flow resistance through the open spaces between the coils is much lower than the flow resistance of the orifice, whose cross sectional dimension determines the maximum flow rate through the regulator valve.

Another feature of the invention is the provision of a fluid pressure regulator valve having the above characteristics wherein the electromagnet is supplied with electric current pulses whose repetition rate and/or duration determines the mean flow through the value. The electric current pulses may have either a fixed repetition rate and variable duration or, alternatively, a variable repetition rate and fixed duration.

BRIEF DESCRIPTION OF DRAWINGS

These and other objects, features and many of the attendant advantages of the invention will become better understood upon a reading of the following detailed description when considered in conjunction with the accompanying drawings, wherein similar elements in each of the several figures are identified by the same reference character; and wherein:

FIG. 1 is a partial, longitudinal sectional, schematic view of a new and improved fluid pressure regulator valve constructed in accordance with the invention;

FIG. 2 is an operating characteristic curve showing the increase in voltage required to operate the valve for increasing pressure differentials wherein the pressure differential is plotted as the abcissa and voltage required to open the valve is plotted as the ordinate; and FIG. 3 is a time versus voltage characteristic curve illustrating the nature of the pulsed electric signals required to regulate (modulate) the opening and closing of the valve of FIG. 1 during operation to control its mean flow.

BEST MODE OF CARRYING OUT INVENTION

As explained more fully in the above-referenced copending U.S. patent application Ser. No. 160,429, the gas spring stiffness is primarily a function of the mid-stroke pressure in the gas springs which are interconnected at mid-stroke to the manifold whose gas pressure is regulated by a gas spring stiffness control valve constructed in accordance with the present invention. The gas spring pressure in turn is a function of the charge of gas (mass of gas content) within the enclosed volumes comprising the gas springs. During a cycle of steady state operation of the RPC, the gas spring volumes receive gas by leakage from ambient gas at discharge pressure into the gas spring volumes. At mid-stroke, both gas spring volumes are momentarily interconnected via the manifold to balance their contents, and to bleed off gas that leaked in over the previous half cycle of RPC operation. This is done by the gas spring stiffness control valve in order to obtain the desired resonant condition (i.e. phase angle $\alpha$ between motor current and plunger velocity.

The problem of controlling the pressure of the gas in the enclosed volumes comprising the gas springs and the interconnecting manifold at mid-stroke is one of controlling gas pressure in the presence of a very low flow of gas at variable magnitudes. Typically, gas flow is between 0.8 and 8 lbs. of regrigerant per hour (0.1 to 1% of total flow) with a pressure drop of between 100 and 40 psi from the control volume to the suction side of the RPC. In order to illustrate the flow resistance that would be required to choke the gas flow from the control volume down to suction line pressure, the dimension of the required orifice for minimum flow rates to maximum flow rate (7° to 95° F. outside temperature) would be in the order from 0.012 to 0.036 inches in diameter. The use of a control element of this nature with such a small opening which would have to be continually variable between the limits listed, is not feasible since the reliability of such a device would be too questionable.

In order to provide a practical flow control system, the novel pressure regulator valve shown in FIG. 1 of the drawings was devised. As shown in FIG. 1, the novel fluid pressure regulator valve made available by the invention, comprises a base member 11 which in the embodiment shown is generally cylindrical in cross section and relatively thick dimensionally in the longitudinal or axial direction. Base member 11 may be fabricated from stainless steel and has a centrally positioned orifice formed throughout its thickness. Base member 11 is secured within the interior of a segment of a conduit 13 whose interior cross sectional dimensions match the exterior cross sectional dimensions of base member 11. Positioned over the orifice 12 in base member 11 is a helically coiled, elongated spring member 13 fabricated from stainless steel and having the coils thereof compressed tightly wound together into engagement with each other so as to enclose completely a central opening or passageway extending through the interior of coil member 14 and having access to the orifice 12 at the end of the elongated spring member secured to base member 11. The remaining end of the elongated coil member 14 (and hence the central open passageway extending through the center thereof) is closed by an L-shaped armature member 15 likewise formed from stainless steel and secured by welding, brazing or the like over the end of the elongated coil member 14. The portion of the pressure regulator valve thus far described is designed to be inserted in a gas pipe line or other fluid conduit shown at 16a and 16b by means of coupling members 17a and 17b. The pressure regulator valve structure thus comprised is mounted within the gas conduit formed by 16a, segment 13 and 16b in a manner such that the elongated helically coiled spring member 14 projects into the high pressure side of the conduit which in turn is connected to the manifold of the RCP and is exposed to the higher pressure atmosphere $P_M$ of the manifold and interconnected gas spring volumes (not shown). The orifice 12 and open central passageway enclosed within the sides of spring member 14 then communicate with the low pressure or suction side $P_S$ of the flow path formed by the gas conduit.

Mounted on the underside of the conduit segment 13 at a position closest to the magnetically permeable armature 15 is an electromagnet shown generally at 18. The electromagnet is comprised by a magnetic field producing coil 19 that surrounds and is secured to a central, magnetically permeable core member 21 secured on conduit segment 13 immediately adjacent the armature 15. The magnetic field producing coil 19 is connected to and supplied by a source of electric current pulses 22.

The arrangement of the electromagnet 18 relative to armature 15 is such that upon the excitation of the magnetic field producing coils 19 by an electric current pulse supplied from source 22, armature 15 is flexed downwardly thereby opening gaps or spaces between the compressed coils that form the enclosed sides of the elongated spring 14. This results in allowing gas at the higher pressure atomsphere $P_M$ to flow through the spaces intermediate the coils and out through the central open passageway and orifice 12 toward the suction end of the conduit. By design, with armature 15 flexed downwardly to open the spaces or gaps between the coils of spring 14 to the fully open position, the flow resistance of the open spaces between the coils of the spring is much less than the flow resistance of the orifice 12. Thus, by appropriately dimensioning orifice 12, the maximum flow rate of the pressure regulator valve can be appropriately tailored to fit the requirements of any particular installation.

Another feature of the pressure regulator valve shown in FIG. 1 is that the higher pressure atmosphere $P_M$ acts directly on the upturned end of the L-shaped armature member 15 to cause the coils of spring 14 to be compressed together thereby further assuring complete turn-off of the valve with the armature member 15 in the non-flexed, normally closed condition. This feature allows the valve to be employed in environments where there are relatively large pressure differentials $\Delta P$ between the higher pressure atmosphere $P_M$ and the lower pressure suction or discharge side of the valve $P_S$ where $\Delta P = P_M - P_S$.

Another feature of the novel pressure regulator valve construction, which is a direct consequence of the feature described in the preceeding paragraph, is that the current required to be supplied to electromagnet 18 (and hence the force developed by the electromagnet required to flex armature 15) in order to open coil 14, is strongly dependent upon the pressure differential across the valve. This pressure differential dependency is shown in FIG. 2 of the drawings wherein the pressure differential is plotted as the abcissa in psi and the voltage $E_i$ required to excite the electromagnet 18 sufficiently to flex armature 15 and open coil 14, is plotted as the ordinate. As shown in FIG. 2, the minimum actuating voltage of 3.3 volts is required in order to overcome the preload present in the close-wound coil spring 14. A pressure differential of 100 psi adds another 7.7 volts to the actuating voltage required.

The pressure regulator valve shown in FIG. 1 is extremely well suited for use in a control concept where the pressure of a volume or cavity being regulated is connected to the flow sink (intake or suction side of the compressor) in a pulsating fashion. By controlling the flow of gas through the valve in a pulsating manner, the flow can be metered by means of a pulse amplitude (duration) and/or repetitiona rate to obtain very fine control over gas flow quantities comprising only 1–2% of the entire gas volume contained within the gas spring means of the RPC. The flow puse rate and/or pulse duration are controlled to obtain the mean flow rate required to maintain the mean desired resonant frequency (i.e. phrase angle $\alpha$). The pulsed control of flow allows the use of a flow switch such as shown in FIG. 1 with a relatively large opening in an on-off manner, and eliminates the need for a controlled flow resistance having a microscopic opening that must be varied between one microscopic value to another. In addition, the pulsed flow control allows for digital control over the operation of the regulator valve shown in FIG. 1 as opposed to analog control.

Pulsed flow control can be obtained with the regulator valve of FIG. 1 by means of a source of electric current pulses 22 which provides either variable repetition rate electric pulses having a fixed time duration (i.e. fixed on-time) or alternatively a fixed repetition rate having a variable pulse duration (i.e. variable on-time). Common to each of these methods is that the volume of gas in one flow pulse must be less than 1–2% of the gas spring volume content, and the repetition rate must be high enough to prevent a phase angle $\alpha$ swing of more than 10° between flow pulses. To satisfy these requirements for use of the control valve in an RPC control system of the type described in copending U.S. application Ser. No. 160,429, the repetition rate must lie betwee 1.3 to 1.6 seconds, which is the time in which the phase angle $\alpha$ would change by 10° if the flow was blocked.

The minimum on-time of the pressure regulator valve depends upon the valve resistance and any additional series resistance, the sum of which must result in a realistic (not too short) on-time. The highest series resistance permissable for a regulator valve intended for use in an RPC control system is an orifice of about 0.036 inch diameter. For an orifice of that size the pressure regulator valve would be open continuously on a 95° F. day. It would be pulsed with an 0.030 second pulse duration (on-time) current pulse and on a 7° F. day at a repetition rate of once per 1.1 seconds. A larger orifice size than 0.036 inches would be undesirable since it would lead to even shorter on-time on 7° F. days.

If a fixed on-time is employed, it must be set at a maximum of 0.03 seconds and the repetition rate will vary between 1.2 seconds on a 57° F. day to once per 0.33 seconds on a 67° F. day, to once per 0.03 seconds on a 95° F. day. The very high repetition rate of 30 hertz on a 95° F. day is unattractive since it may lead to unacceptable wear and fatigue behavior of the pressure regulator valve.

Due to the above considerations, a control system employing a fixed repetition rate and variable pulse duration (on-time) appears to be the most attractive. The pulse repetition rate is set by the shortest time in which the gas spring volume of the RPC will stiffen-up enough to shift phase angle $\alpha$ by 10° within one cycle of operation. The shortest time occurs on a 95° F. day, and it is 0.28 seconds. Therefore, if a pulse repetition rate of once per 0.28 seconds is used, the phase angle $\alpha$ will not change more that 10° per pulse under any circumstances. The shortest time occurs where one cycle of operation will be about 0.008 seconds for outdoor temperatures of 7° F. to 57° F. Typically, this on-time is 4–8 times longer than one cycle of resonant vibration of the spring element, as observed when it is returning to a closed position. Therefore, the (inexpensive, simple and reliable) pressure regulator valve shown in FIG. 1 is quite capable of operation within these ranges.

FIG. 3 of the drawings illustrates a control cycle concept which employs a series of actuating cycles of fixed repetition rate and variable pule duration (variable duty cycle) for the pressure regulating valve of FIG. 1. FIG. 3 illustrates the case where the pressure related spring voltage $E_{ip}$ (p=pressure differential) exceeds a certain reference voltage $E_{is}$ (s=schedule) as set by for example the outside temperature. As a result the valve on-time is increased, flow increases and differential pressure drops. The pressure drop is visible in the decrease in the valve opening voltage occurring from left to right in FIG. 3. As soon as the valve opening voltage $E_{ip}$ reaches the scheduled value $E_{is}$, the duty cycle is maintained at the level present.

In constructing the fluid pressure regulator valve shown in FIG. 1 of the drawings, it is anticipated that at least the conduit segment 13, the base member 11 together with its orifice 12, helically coiled spring member 14, armature member 15 and attached electromagnetic coil 18 would be constructed as a unitary structure for ready insertion and mounting in fluid pipelines and the like. Additionally, while the pressure regulator valve has been described as intended for use in controlling the flow of gas in a resonant piston compressor control system, it will be apparent to those skilled in the art that the pressure regulator valve readily can be adapted for uses in other applications including hydraulically as well as pneumatic systems.

INDUSTRIAL APPLICATION

The invention makes available a new and improved fluid regulator valve and method of control for variably controlling fluid flow at very low flow rates by opening and closing the valve in a pulsating manner. The digital character of the valve and its control circuitry and its low inherent cost make it eminently compatible with micrologic circuitry in mass production applications. The improved regulator valve is designed for inclusion in a resonant free piston compressor control system for finely controlling the stiffness of enclosed resilient gas spring volumes of the resonant piston compressor.

Having described one embodiment of a new and improved fluid flow regulator valve constructed in accordance with the invention, it is believed obvious that other modifications, variations and changes in the embodiments of the invention disclosed will be apparent to those skilled in the art in the light of the above teachings. It is therefore to be understood that any such changes are believed to be encompassed by the true spirit and scope of the invention as defined by the appended claims.

What is claimed is:

1. An improved fluid pressure regulator valve comprising a base member having a flow control orifice therethrough adapted to be secured in a fluid conduit in a position to stop all fluid flow through the conduit with the regulator valve in a full closed position, an elongated helically coiled spring member having the coils thereof compressed into engagement with each other to enclose the sides of the spring member in a fluid-tight manner and adapted to be mounted within the fluid conduit on the upstream side of said base member, said helically coiled spring having a central open passageway therethrough with one end closed in a fluid-tight manner and the remaining open-end secured over the orifice through said base member, a magnetically permeable armature secured to the closed end of the helically coiled spring for flexing the spring in an off-axis direction, and an electromagnet positioned adjacent the armature for producing lines of magnetic flux which thread the armature and cause the armature to lever the helically coiled spring open in an off-axis direction and thereby open spaces between the compressed coils comprising the enclosed sides of the spring and allow fluid flow through the regulator valve upon actuation of the electromagnet.

2. A fluid pressure regulator valve according to claim 1 wherein the orifice formed through said base member is sized to determine the maximum flow rate through the regulator valve with the valve in a fully open position and wherein with the armature flexure of the helical coils of the spring to its fully open position fluid flow resistance through the open spaces between the coils of the spring is much smaller than the flow resistance through the orifice.

3. A fluid pressure regulator valve according to claim 1 wherein the electromagnet is supplied with electric current pulses whose repetition rate and/or duration fully open the valve repetitively at a repetition rate determined by the repetition rate of the electric current pulses to thereby regulate (modulate) fluid flow through the valve.

4. A fluid pressure regulator valve according to claim 2 wherein the electromagnet is supplied with electric current pulses whose repetition rate and/or duration fully open the valve repetitively at a repetition rate determined by the repetition rate of the electric current pulses to thereby regulate (modulate) fluid flow through the valve.

5. A fluid pressure regulator valve according to claim 3 wherein the electric current pulses supplied to the electromagnet have a fixed repetition rate and variable duration to thereby open the regulator valve for variable periods of time at a fixed repetition rate.

6. A fluid pressure regulator valve according to claim 4 wherein the electric current pulses supplied to the electromagnet have a fixed repetition rate and variable duration to thereby open the regulator valve for variable periods of time at a fixed repetition rate.

7. A fluid pressure regulator valve according to claim 3 wherein the electric current pulses supplied to the electromagnet have a variable repetition rate and fixed duration to thereby open the regulator valve for fixed periods of time at a variable rate.

8. A fluid pressure regulator valve according to claim 4 wherein the electric current pulses supplied to the electromagnet have a variable repetition rate and fixed duration to thereby open the regulator valve for fixed periods of time at a variable rate.

9. A fluid pressure regulator valve according to claim 1 wherein the valve is mounted in a fluid conduit with the helically coiled spring member thereof projected into the conduit on the high fluid pressure side of the base member and the high fluid pressure helps in keeping the coils of the spring closed on each other in the fully closed position of the valve.

10. A fluid pressure regulator valve according to claim 2 wherein the valve is mounted in a fluid conduit with the helically coiled spring member thereof projected into the conduit on the high fluid pressure side of the base member and the high fluid pressure helps in keeping the coils of the spring closed on each other in the fully closed position of the valve.

11. A fluid pressure regulator valve according to either of claims 1, 2, 9 or 10 wherein the helically coiled spring member, the base member and the armature are fabricated from stainless steel and the entire valve assembly including the electromagnet and a short section of conduit in which the valve is secured are constructed as a unitary structure for ready insertion and mounting in fluid pipe lines and the like.

* * * * *

UNITED STATES PATENT AND TRADEMARK OFFICE
CERTIFICATE OF CORRECTION

PATENT NO. : 4,319,606
DATED : May 5, 1982
INVENTOR(S) : Leo Hoogenboom

It is certified that error appears in the above-identified patent and that said Letters Patent are hereby corrected as shown below:

Column 1, Line 26, "springmass" should be --spring-mass--
          Line 48, delete "and" before the word stroke Column 5, Line 27, "repetitiona" should be --repetition--
          Line 30, "puse" should be --pulse--
          Line 33, "phrase" should be --phase--
          Line 55, "betwee" should be --between--

Column 6, Line 32, "pule" should be --pulse--
          Line 57, "lically" should be --lic--

Column 7,
          Line 41, add the word "fluid" before flow

Signed and Sealed this

Seventeenth Day of August 1982

[SEAL]

Attest:

GERALD J. MOSSINGHOFF

Attesting Officer     Commissioner of Patents and Trademarks